United States Patent
Chang (10) Patent No.: US 6,173,365 B1
(45) Date of Patent: Jan. 9, 2001

(54) CACHE MEMORY SYSTEM AND METHOD OF A COMPUTER

(75) Inventor: Nai-Shung Chang, Taipei (TW)

(73) Assignee: VIA Technologies, Inc., Taipei Hsien (TW)

( * ) Notice: Under 35 U.S.C. 154(b), the term of this patent shall be extended for 0 days.

(21) Appl. No.: 09/122,454

(22) Filed: Jul. 24, 1998

(30) Foreign Application Priority Data

Mar. 17, 1998 (TW) ................................................ 87103899

(51) Int. Cl.$^7$ .................................................. G06F 12/00
(52) U.S. Cl. ............................................................ 711/118
(58) Field of Search ................................. 711/3, 118, 143

(56) References Cited

U.S. PATENT DOCUMENTS

| | | | |
|---|---|---|---|
| 5,450,542 | * | 9/1995 | Lehman et al. ....................... 395/162 |
| 5,454,107 | * | 9/1995 | Lehman et al. ....................... 395/480 |
| 5,659,715 | * | 8/1997 | Wu et al. ........................ 395/497.01 |
| 5,732,244 | * | 3/1998 | Gujral ................................... 395/468 |
| 6,032,231 | * | 2/2000 | Gujral ................................... 711/145 |

* cited by examiner

Primary Examiner—Eddie P. Chan
Assistant Examiner—Kevin Verbrugge
(74) Attorney, Agent, or Firm—Thomas, Kayden, Horstemeyer & Risley (57) ABSTRACT

A high-performance and cost-effective cache memory system is provided for use in conjunction with a high-speed computer system. The cache memory system is used on a computer system having a central processing unit (CPU) of the type having a back-off function that can be activated to temporarily halt the CPU when receiving a back-off signal. The cache memory system is capable of enabling the back-off signal in the event that the data read request signal from the CPU is determined to be a miss. During the back-off duration of the CPU, the requested data are moved from the primary memory unit to the cache memory module. This feature allows the overall performance of the computer system to be high even though a low-speed tag random-access memory (RAM) is used in the cache memory system, allowing the computer system to be highly cost-effective to use with high performance.

30 Claims, 7 Drawing Sheets

CACHE MEMORY SYSTEM AND METHOD OF A COMPUTER

CROSS-REFERENCE TO RELATED APPLICATION

This application claims the priority benefit of Taiwan application serial no. 87103899, filed Mar. 17, 1998, the full disclosure of which is incorporated herein by reference.

BACKGROUND OF THE INVENTION

1. Field of the Invention

This invention relates to computers, and more particularly, to a cache memory system and a method for accessing this cache memory system, which allow the computer system to operate with high performance even though a low-speed tag RAM is used in the cache memory system.

2. Description of Related Art

In the use of computers, performance is a primary concern. A computer system's performance can be enhanced in various ways, such as by using a high-speed CPU instead of a low-speed one. In the past, the PC/XT-based IBM-compatible personal computers (PC) were driven by a system clock of only 4.77 MHz. Nowadays, however, most IBM-compatible PCs are running at 100 MHz or higher. The use of high-speed CPUs can undoubtedly increase the overall performance of the computer system. However, using a high-speed CPU also requires use of high-speed peripheral devices in conjunction with the high-speed CPU. If a low-speed peripheral device, such as a low-speed memory, is used in conjunction with high-speed CPU, the overall performance of the computer system is still unsatisfactorily low.

A computer system typically includes two types of memories: ROM (read-only memory) and RAM (random-access memory). The ROM is used to permanently store repeatedly used programs and data, such as the booting routines, while the RAM is used to store frequently updated or changed programs and data. ROMs are typically slower in speed than RAMs. Therefore, in operation, the programs stored in the ROM are customarily moved to the RAM after the computer has been booted. This scheme allows an increase in the performance of the computer system. Furthermore, there are two types of RAMs: SRAM (static random-access memory) and DRAM (dynamic random access memory). SRAMs are higher in speed than DRAMs. But since SRAMs are significantly smaller in packing density and more difficult to manufacture than DRAMs, DRAMs are more cost-effective to use than SRAMs. Therefore, although lower in speed, DRAMs are widely used as the primary memory on most computer systems.

Use of a high-speed CPU is used in conjunction with a low-speed DRAM gives rise to the problem of a performance bottleneck. A solution to this problem is to provide a so-called cache memory in addition to the primary memory. In this solution, low-speed DRAMs are used as the primary memory of the computer system, while high-speed SRAMs are used as the cache memory. The cache memory stores the most frequently accessed blocks of programs and data from the primary memory. When requesting data, the CPU first checks whether the requested data are stored in the cache memory; if not, the CPU then turns the request to the primary memory. The use of cache memory can significantly increase the overall performance of the computer system. However, since the cache memory is much smaller in capacity than the primary memory, the requested data may not be always found in the cache memory. It is called a hit if the requested data are currently stored in the cache memory and a miss if not. The term "cache hit rate" refers to the number of times that an operand requested by the CPU is found in the cache memory. Therefore, the cache hit rate is a measure of the performance of a cache algorithm. In the case of IBM-compatible PCs, if the cache memory is larger than 512 KB (kilobyte) in capacity, the cache hit rate can be higher than 90%, which can considerably help improve the overall performance of the computer system. Furthermore, the use of a new type of SRAM, called PBSRAM (pipelined burst static random-access memory), as the cache memory can further increase the overall performance of the computer system.

Figure 1:
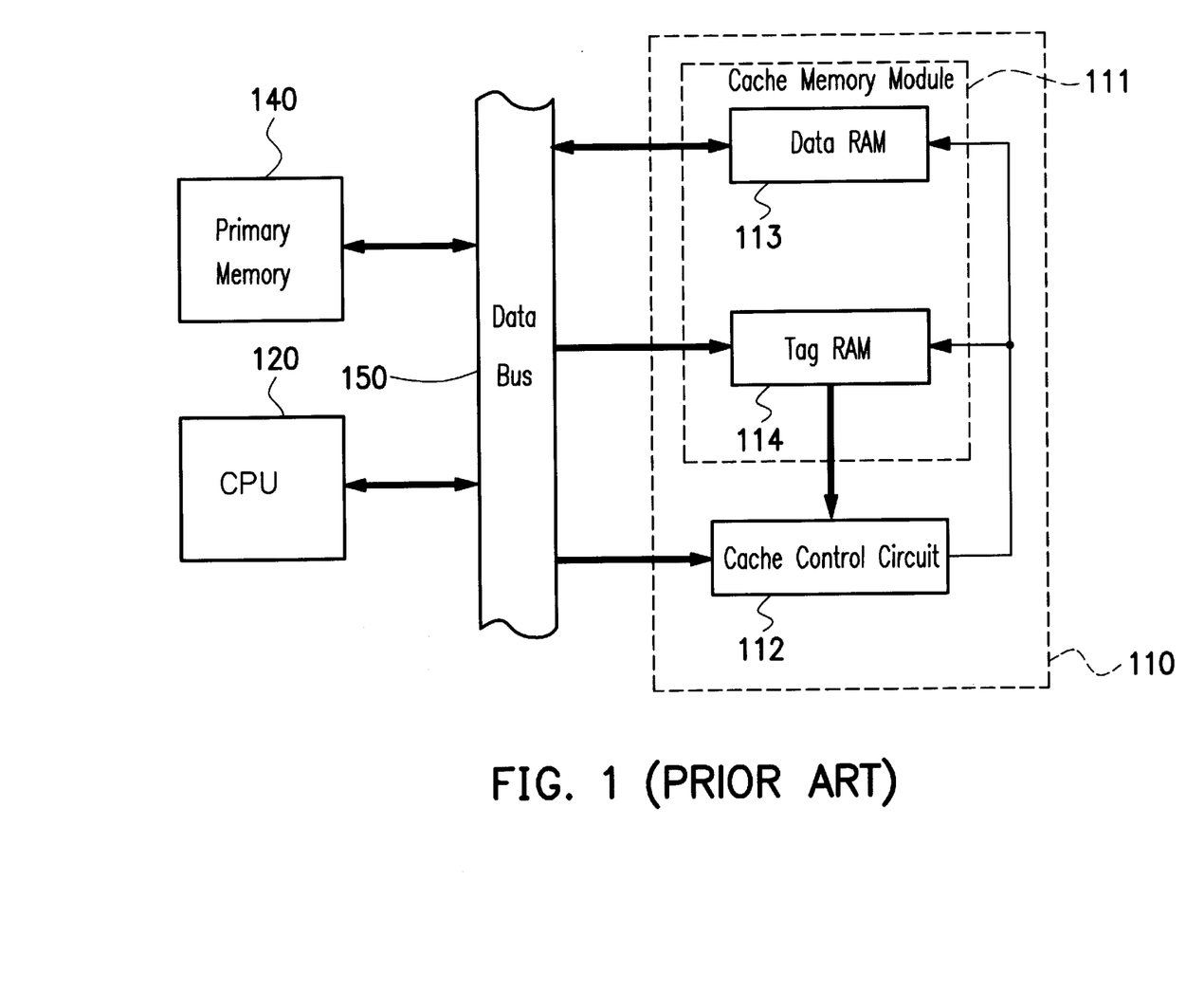
FIG. 1 is a schematic diagram showing the architecture of a computer system utilizing a conventional cache memory system.

FIG. 1 is a schematic diagram showing the architecture of a conventional cache memory system used in conjunction with a computer system. The cache memory system here is the part enclosed in a dashed box indicated by the reference numeral 110. As shown, the cache memory system 110 includes a cache memory module 111, which includes a data RAM unit 113 and a tag RAM unit 114, and a cache control circuit 112. All of the constituent components of the cache memory system 110 are coupled via a common data bus 150 to the CPU 120 and the primary memory unit 140 of the computer system for data exchange. The cache control circuit 112 is used to control access to the cache memory module 111 in response to any read/write requests from the CPU 120. When a block of data in the primary memory unit 140 is placed in the cache memory module 111, the data values thereof are stored in the data RAM unit 113 while the tag values used to help map the addresses in the data RAM unit 113 to the primary memory unit 140 are stored in the tag RAM unit 114. Moreover, the tag RAM unit 114 stores a so-called "dirty bit" that is used to indicate whether the data currently stored in the data RAM unit 113 have been updated by the CPU 120.

Figure 2A:
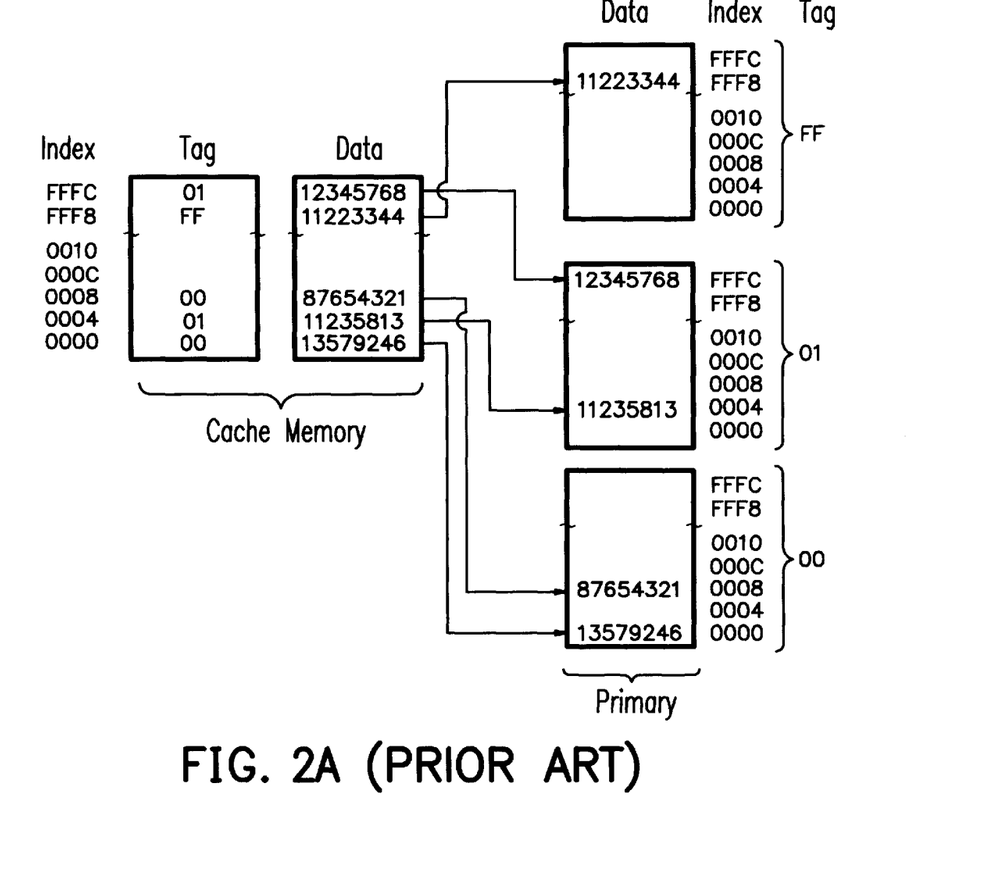
FIG. 2A is a schematic diagram used to depict the scheme of mapping the data stored in the cache memory to the primary memory.
Figure 2B:
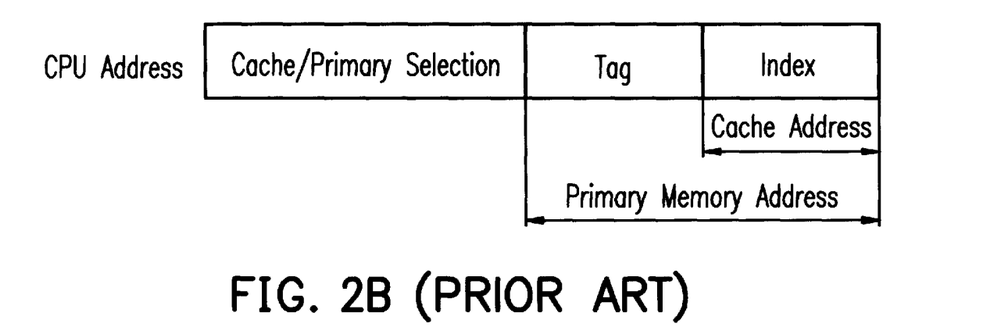
FIG. 2B is a schematic diagram used to depict the addressing method used by the conventional cache memory system.

The scheme for mapping the data and address values from the primary memory unit 140 to the cache memory module 111 is depicted in FIG. 2A. As mentioned earlier, when a block of data in the primary memory unit 140 is placed in the cache memory module 111, the data values thereof are stored in the data RAM unit 113 while the tag values are stored in the tag RAM unit 114. As shown in FIG. 2B, the physical addresses of this block of data can be determined by combining the tag values with the index values. When the CPU 120 references a particular address in the primary memory unit 140, the value of that address can be directly mapped by a direct mapping method to the cache memory module 111 so as to fetch the requested data from the mapped addresses in the cache memory module 111.

To determine whether the request from the CPU is a hit or a miss, the address values issued by the CPU 120 are compared with the contents stored in the tag RAM unit 114. If matched, the requested data are currently stored in the cache memory module 111; otherwise, the requested data are not stored in the cache memory module 111 and access is turned to the primary memory unit 140. The access speed to the tag RAM unit 114 is therefore one of the primary factors that affect the overall performance of the computer system.

Figure 3:
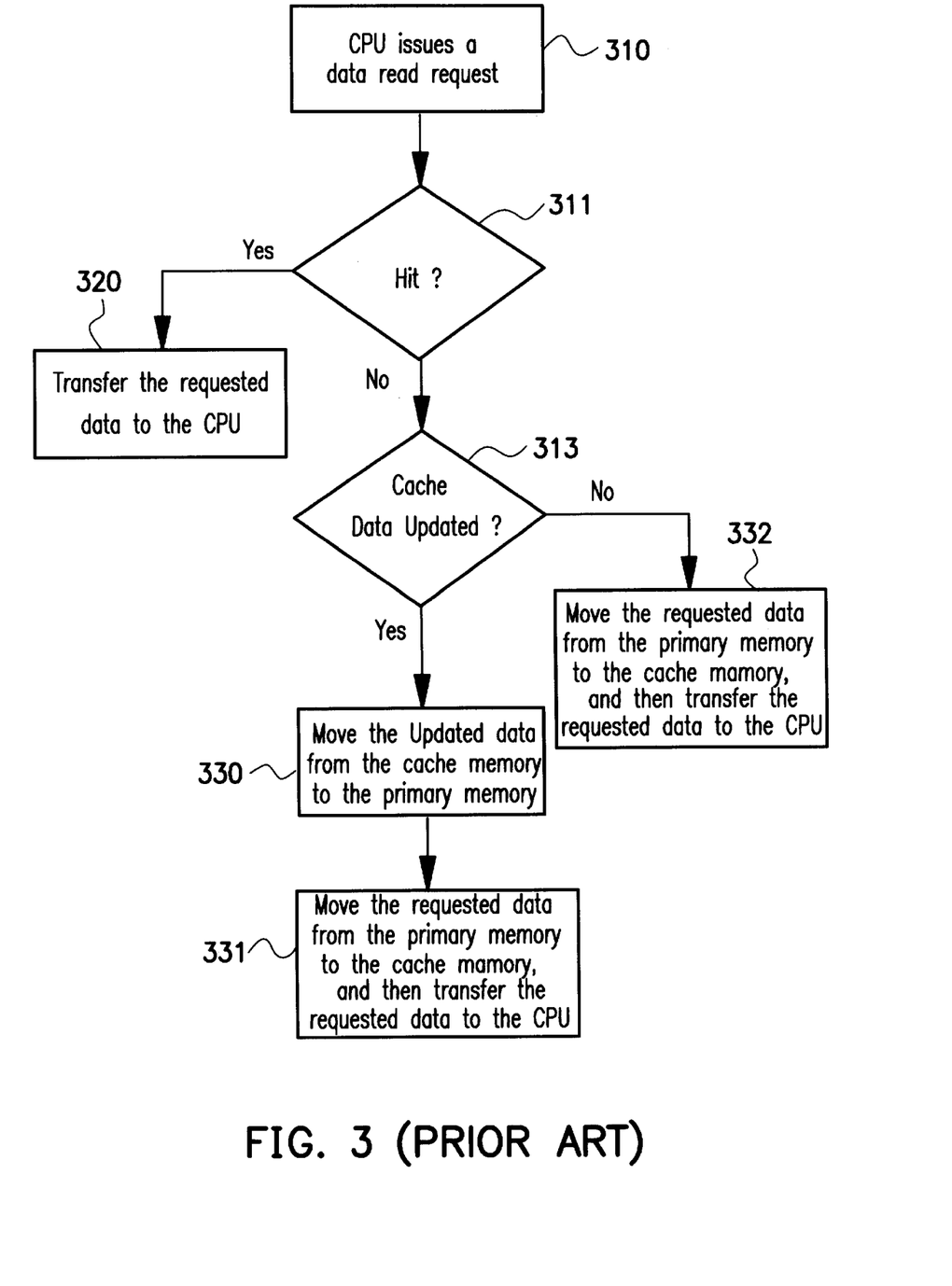
FIG. 3 is a flow diagram showing the procedural steps involved in a conventional access method for reading data from the conventional cache memory system of FIG. 1.

FIG. 3 is a flow diagram showing the procedural steps involved in a conventional cache read algorithm for reading data from the cache memory system 110. This algorithm is carried out by the cache control circuit 112 in response to a data read request signal from the CPU 120.

As shown, in the initial step 310, the CPU 120 issues a data read request signal to the cache memory system 110.

In the next step 311, the cache memory system 110 checks whether the data read request signal is a hit or a miss to the cache memory system 110.

If it is a hit, the procedure goes to step 320, in which the requested data are transferred from the cache memory module 111 to the CPU 120.

Otherwise, if it is a miss, the procedure goes to step 313, in which the cache control circuit 112 checks whether the data currently stored in the cache memory module 111 have been updated.

If not updated, the procedure goes to step 332 in which the data requested by the CPU 120 are moved from the primary memory unit 140 to the cache memory module 111, and subsequently transferred from the cache memory module 111 to the CPU 120. This completes the response to the request from the CPU 120.

Otherwise, if updated, the procedure goes to step 330 in which the updated data are moved from the cache memory module 111 to the primary memory unit 140. The procedure then goes on to step 331 in which the data requested by the CPU 120 are moved from the primary memory unit 140 to the cache memory module 111, and subsequently transferred from the cache memory module 111 to the CPU 120. This completes the response to the request from the CPU 120.

Figure 4:
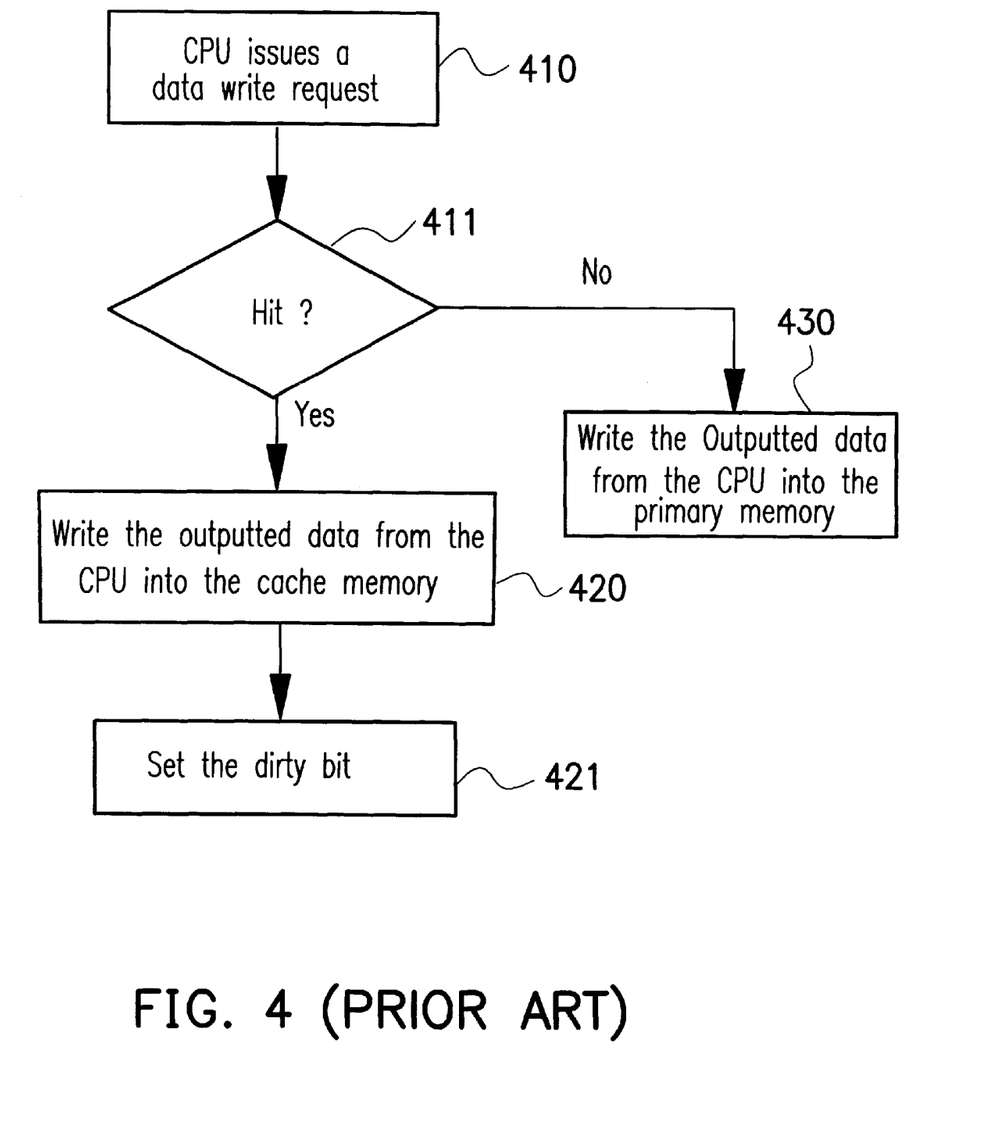
FIG. 4 is a flow diagram showing the procedural steps involved in a conventional access method for writing data into the conventional cache memory system of FIG. 1.

FIG. 4 is a flow diagram showing the procedural steps involved in a conventional cache write algorithm for writing data into the cache memory module 111 in the cache memory system 110. This algorithm is carried out by the cache control circuit 112 in response to a data write request signal from the CPU 120.

As shown, in the initial step 410, the CPU 120 issues a data write request signal to the cache memory system 110. The data write request signal indicates that the CPU 120 has generated some new or updated data that are to be added back to the original data.

In the next step 411, the cache memory system 110 checks whether the data write request signal is a hit or a miss to the cache memory system 110.

If it is a miss, the procedure goes to step 430, in which the output data from the CPU 120 are written into the primary memory unit 140.

Otherwise, if it is a hit, the procedure goes to step 420, in which the output data from the CPU 120 are written into the cache memory module 111. The procedure then goes to step 421, in which the dirty bit is set to indicate that the data currently stored in the data RAM unit 113 have been updated.

The conventional cache memory system described performs well, provided that it is used in conjunction with a low-speed CPU. If used in conjunction with a high-speed CPU, such as Intel's 100 MHz P54C CPU, the overall performance of the computer system is still very low. The reason for this is described in the following.

Since Intel's P54C CPU runs at 100 MHz, the period of the clock signal is 10 ns (nanosecond). In the prior art of FIG. 1, when the cache memory system 110 receives a data read/write request signal from the CPU 120, it first checks whether the request is a hit or a miss to the data currently stored in the cache memory module 111. However, the P54C CPU is designed to receive the requested data (in the case of a read request) or output the updated data (in the case of a write request) at the third clock period after the issuing of the request signal. Therefore, the cache memory system 110 should complete the hit/miss checking process in less than three clock periods; i.e., step 311 shown in FIG. 3 and step 411 shown in FIG. 4 should be completed in just one or two clock periods. The conventional cache memory system 110, however, is hardly able to achieve this. The reason is described in the following.

When the cache memory system 110 checks whether the request signal is a hit or a miss, it must first access the data currently stored in the tag RAM unit 114. The access time to the tag RAM unit 114 should therefore be less than two clock periods, i.e. 20 ns. Presently, the RAM products on the market that can be used to serve as the tag RAM unit 114, which comes with 7.2 ns, 8 ns, 10 ns, 12 ns, and 15 ns in access time. According to their nominal specifications, these tag RAM units are all less than 20 ns in access time. However, when actually used on a cache memory system, a number of delay times can be involved, which can add up to an overall access time of greater than 20 ns.

The term "valid delay" refers to the period from the time point when the address bus starts to change voltage states to the time point when the voltage states representative of the output address values are stabilized. In the case of the P54C CPU, the valid delay is 4 ns (which can be found in the operating manual of P54C CPU).

Moreover, it takes a delay time of about 2 ns to transfer the outputted address values from the CPU 120 over the common data bus 150 to the tag RAM unit 114. This delay time is generally proportional to the length of the printed data lines on the motherboard over which the address values are transferred.

In response to the request signal, it then takes a delay time of another 2 ns to transfer the outputted data from the tag RAM unit 114 to the cache control circuit 112.

Next, it takes a setup time of about 3.8 ns for the cache control circuit 112 to wait until the received data from the tag RAM unit 114 are stabilized in voltage states on the data bus.

Still further, although the cache control circuit 112 and the CPU 120 are driven by the same system clock signal, there exists a lag in synchronization that causes the cache control circuit 112 to receive the clock signal by a delay time of about 0.5 ns.

Assume that a fast tag RAM of 8 ns is chosen to serve as the tag RAM unit 114 in the cache memory system 110 of FIG. 1. Then summing up all the above-mentioned delay times, an overall delay time of 20.3 ns is obtained, which is greater than the allowed delay time of 20 ns. If an even faster tag RAM of 7.2 ns is chosen, the overall delay time can be reduced to 19.5 ns. Although this delay time is just a little less than the allowed delay time of 20 ns, it still considerably increases the implementation cost. The overall delay time can be further reduced by reducing the length of the printed data bus over which the data are transferred between the CPU and the cache memory system, but this solution can only provide a slight improvement on the access time which is insubstantial. A better solution is to alter the CPU specification in such a manner as to allow three waiting periods instead of two. This can increase the allowable time for response from 20 ns to 30 ns, thus allowing the use of a low-cost tag RAM with an access time of 10 ns, 12 ns, or 15 ns. However, since one additional waiting period is required, the overall performance of the computer system would be significantly reduced.

As a summary, the conventional cache memory system has the following disadvantages.

(1) First, when it is used in conjunction with a high-speed CPU, it can degrade the overall performance of the computer system in that the access to the tag RAM can cause a long waiting time for the CPU.

(2) Second, the use of a high-speed tag RAM will cause the manufacturing cost of the cache memory system to be high, making the computer system less competitive on the market.

(3) Third, the use of a low-speed tag RAM to save manufacturing cost will then cause the overall performance of the computer system to be low, making the computer system less appealing to the customers.

SUMMARY OF THE INVENTION

It is therefore an objective of the present invention to provide a cache memory system, which can be used in conjunction with a high-speed CPU to allow an overall high performance of the computer system.

It is another objective of the present invention to provide a cache memory system which can be used on a high-speed computer system without needing to use a high-speed tag RAM to allow high system performance, thus making the computer system very cost-effective to use and manufacture.

It is still another objective of the present invention to provide a cache memory system, which can be used on a computer system without needing to use a high-speed tag RAM, while still allowing the computer system to retain high-speed performance.

In accordance with the foregoing and other objectives of the present invention, a cache memory system and a method for accessing the cache memory system are provided.
The cache memory system of the invention is provided for use in conjunction with a computer system having a primary memory unit and a CPU of the type having a back-off function that can be activated to temporarily halt the CPU when receiving a back-off signal. The cache memory system of the invention is characterized by the ability of the cache control circuit to enable the back-off signal in the event that a data read request signal from the CPU is determined to be a miss so as to temporarily halt the CPU, and its ability to disable the back-off signal after the requested data have been moved from the primary memory to the cache memory.

The cache memory system of the invention comprises a cache memory module, coupled to the CPU and the primary memory unit for storing selected blocks of data from the primary memory unit, and a cache control circuit for controlling the data transfer among the cache memory module, the primary memory unit, and the CPU. Furthermore, the cache memory module comprises a data RAM unit for storing the selected blocks of data from the primary memory unit and a tag RAM for storing the tag values of the data stored in the data RAM unit. The back-off signal is generated by the cache control circuit.

In the event of the CPU issuing a data read request signal, the cache memory system performs the following steps of: setting the cache memory system promptly into a ready state for data transfer to the CPU; checking whether the data read request signal is a hit or a miss to the cache memory module; if it is a hit, moving the requested data from the cache memory module to the CPU; otherwise, if it is a miss, enabling the back-off signal to halt the CPU; checking whether the data currently stored in the data RAM unit have been updated or not; if not updated, moving the requested data from the primary memory unit to the cache memory module the CPU and then disabling the back-off signal to resume CPU operation; and if updated, moving the data currently stored in the cache memory module back to the primary memory unit, then moving the requested data from the primary memory unit to the cache memory module, and then disabling the back-off signal to resume CPU operation.

On the other hand, in the event of the CPU issuing a data write request signal, the cache memory system performs the following steps of: requesting the CPU to allow one additional clock period for response; checking whether the data write request signal is a hit or a miss; if it is a hit, writing the outputted data from the CPU into the cache memory module; and if it is a miss, transferring the outputted data from the CPU to the primary memory unit; and moving the requested data from the primary memory unit to the cache memory module.

The invention allows the overall performance of the computer system to be high even though a low-speed tag RAM is used in the cache memory system, allowing the computer system to be highly cost-effective to use with high performance.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 5:
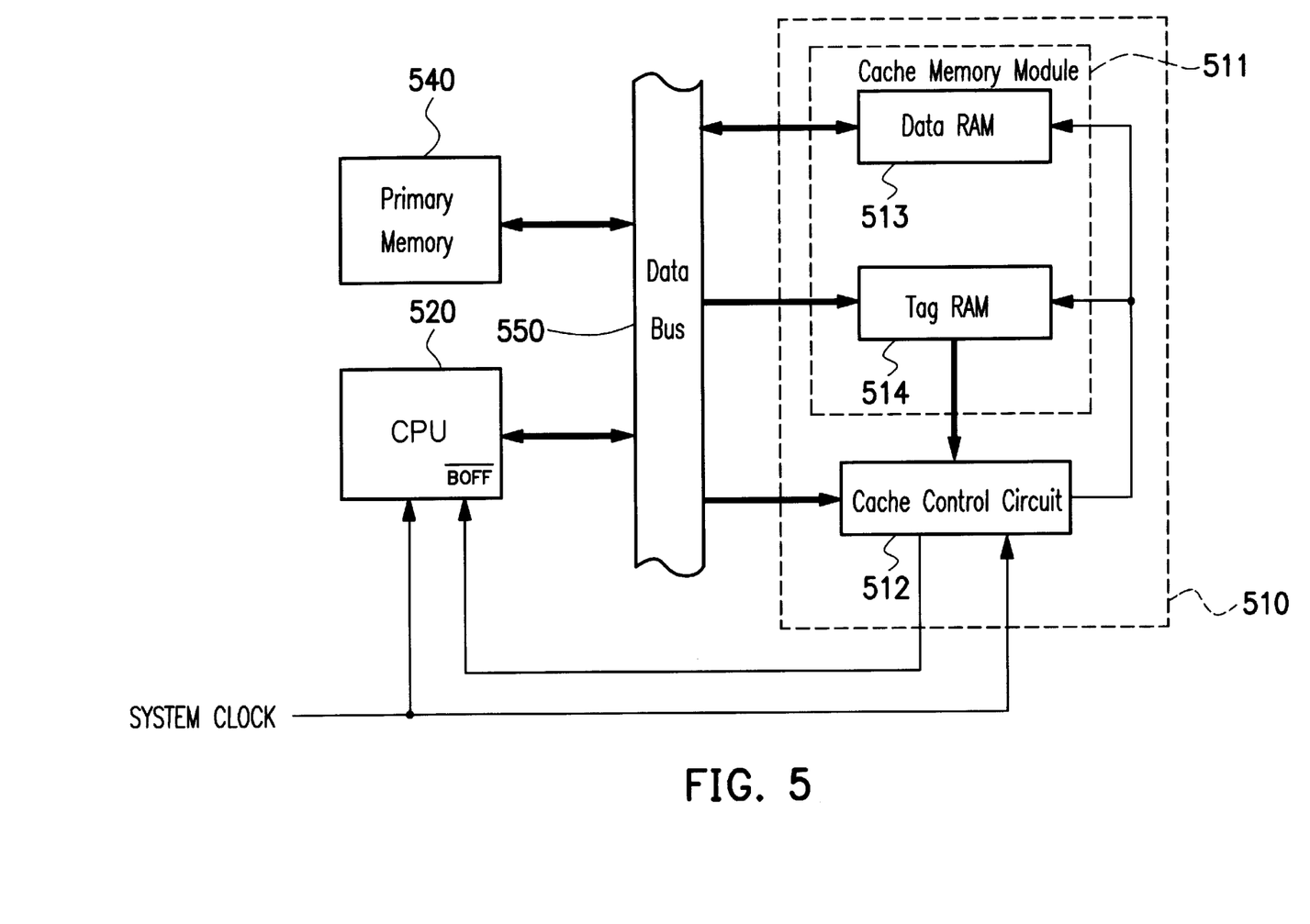
FIG. 5 is a schematic diagram showing the architecture of a computer system utilizing the cache memory system of the invention.

FIG. 5 is a schematic diagram showing the architecture of a computer system utilizing the cache memory system of the invention. The cache memory system here is the part enclosed in a dashed box indicated by the reference numeral 510. As shown, the cache memory system 510 includes a cache memory module 511 and a cache control circuit 512. Furthermore, the cache memory module 511 includes a data RAM unit 513 and a tag RAM unit 514. All the constituent components of the cache memory system 510 are coupled via a common data bus 550 to the CPU 520 and the primary memory unit 540 of the computer system. The CPU 520 and the cache memory system 510 are both driven by the same system clock signal CLK. The CPU 520 is of the type having a $\overline{BOFF}$ pin that can be used to activate a back-off function to temporarily halt the CPU when receiving an externally generated a back-off signal. In the case of FIG. 5, the back-off signal is generated by the cache control circuit 512. Whenever the CPU 520 receives the $\overline{BOFF}$ signal (i.e., when $\overline{BOFF}$=1) from the cache control circuit 512, it will promptly halt all current operations until the $\overline{BOFF}$ signal is disabled (i.e., when $\overline{BOFF}$=0). Most CPUs, such as the Intel's P54C CPU, come with such a back-off function. On the Intel's Pentium II CPU, the back-off function can be implemented by using the DEFER port.

The cache control circuit 512 is used to control access to the cache memory module 511 in response to any read/write requests from the CPU 520. When a block of data in the primary memory unit 540 is placed in the cache memory module 511, the data values thereof are stored in the data RAM unit 513 while the tag values are stored in the tag RAM unit 514. Moreover, the tag RAM unit 514 stores a dirty bit whose value indicates whether the data currently stored in the data RAM unit 513 have been updated.

The data RAM unit 513 and the tag RAM unit 514 are, for example, SRAMs. Besides, the data RAM unit 513 can be a PBSRAM. The data exchange among the CPU 520, the primary memory unit 540, the data RAM unit 513, and the tag RAM unit 514, are carried over the same data bus 550.

Figure 6:
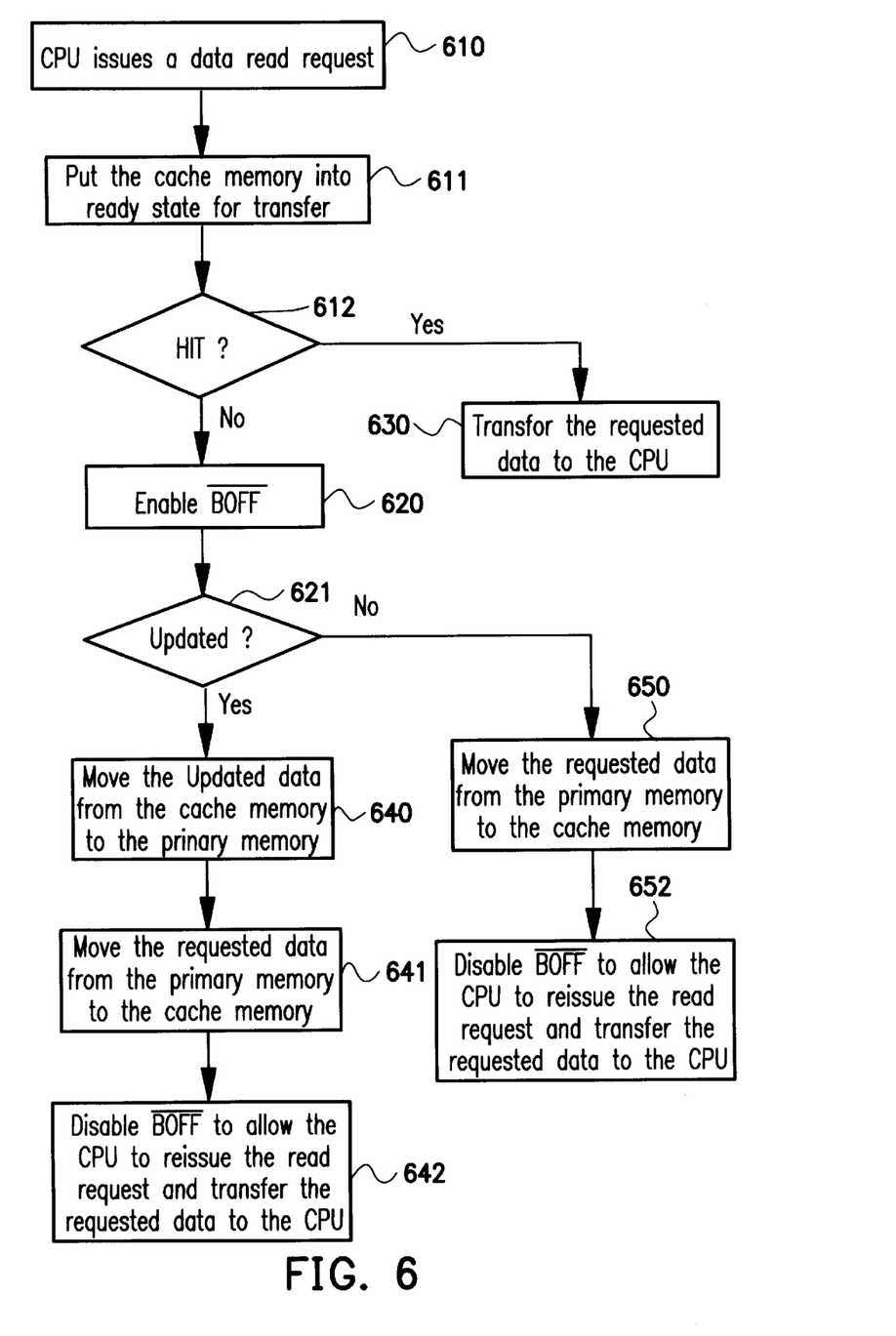
FIG. 6 is a flow diagram showing the procedural steps involved in the method of the invention for reading data from the cache memory system of the invention.

FIG. 6 is a flow diagram showing the procedural steps involved in the method of the invention for reading data from the cache memory system 510 in response to a data read request signal from the CPU 520.

As shown, in the initial step 610, the CPU 520 issues a data read request signal to the cache memory system 510.

In the next step 611, the cache memory system 510 is promptly put into the ready state for data transfer no matter whether the data read request signal is a hit or a miss.

In the next step 612, the cache memory system 110 checks whether the data read request signal is actually a hit or a miss to the cache memory module 511.

If it is a hit, the procedure goes to step 630, in which the requested data are transferred from the cache memory module 511 to the CPU 520.

Otherwise, if it is a miss, the procedure goes to step 620, in which the cache control circuit 512 enables the back-off signal $\overline{\text{BOFF}}$ and transfers it to the CPU 520, thus causing the CPU 520 to halt.

In step 621, the dirty bit in the tag RAM unit 514 is checked to see if the data currently stored in the data RAM unit 513 have been updated. If yes, the procedure goes to step 640; otherwise, if no, the procedure goes to step 650.

In step 650, the data requested by the CPU 520 are moved from the primary memory unit 540 to the cache memory module 511; and after this, the $\overline{\text{BOFF}}$ signal is disabled, causing the CPU 520 to resume operation. The procedure then goes to step 652, in which the CPU 520 reissues the same data read request signal once again to the cache memory system 510, thus causing the requested data, now stored in the cache memory module 511, to be transferred to the CPU 520. This completes the response to the read request from the CPU 520.

On the other hand, in step 640, the updated data are moved from the cache memory module 511 to the primary memory unit 540. The procedure then goes to step 641 in which the data requested by the CPU 520 are moved from the primary memory unit 540 to the cache memory module 511; and after this, the $\overline{\text{BOFF}}$ signal is disabled. The procedure then goes to step 642, in which the CPU 520 reissues the same data read request signal once again to the cache memory system 510, thus causing the requested data, now stored in the cache memory module 511, to be transferred to the CPU 520. This completes the response to the read request from the CPU 520.

Figure 7:
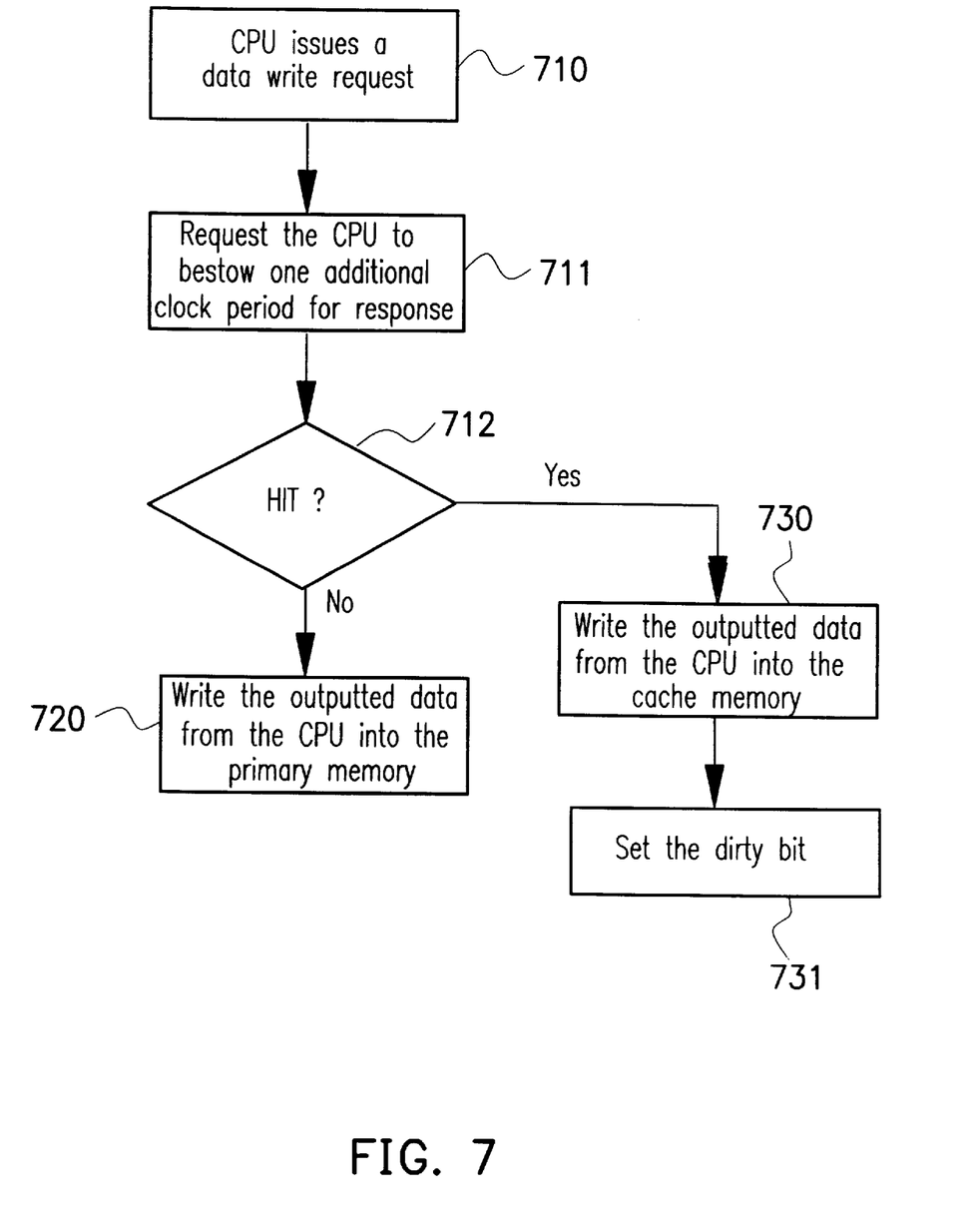
FIG. 7 is a flow diagram showing the procedural steps involved in the method of the invention for writing data into the cache memory system of the invention.

FIG. 7 is a flow diagram showing the procedural steps involved in the method of the invention for writing data into the cache memory module 511 in the cache memory system 510 in response to a data write request signal from the CPU 520.

As shown, in the initial step 710, the CPU 520 issues a data write request signal to the cache memory system 510. The data write request signal indicates that the CPU 520 has generated some new or updated data that are to be added back to the original data.

In the next step 711, in response to the data write request signal, the cache memory system 510 requests the CPU 520 to allow one additional clock period for response. The reason for this action is that, in the case that a low-speed tag RAM is used, it is sure that the hit/miss checking process will not be completed within two clock periods, and therefore, the cache memory system 510 simply requests the CPU 520 to allow one additional waiting period for response. In general, data write requests are be lower in cache hit rate than data read requests, and the CPU issues data read request signals more often than data write request signals. Therefore, the request for one additional clock period hardly affects the overall performance of the computer system.

In the subsequent step 712, the cache memory system 510 checks whether the data write request signal is a hit or a miss to the cache memory module 511.

If it is a miss, the procedure goes to step 720, in which the output data from the CPU 520 are written into the primary memory unit 540. This completes the response to the write request from the CPU 520.

Otherwise, if it is a hit, the procedure goes to step 730, in which the output data from the CPU 520 are written into the cache memory module 511. The procedure then goes to step 731, in which the dirty bit in the tag RAM unit 514 is set to indicate that the data currently stored in the cache memory module 511 have been updated. This completes the response to the write request from the CPU 520.

The foregoing discloses the cache memory system and method for accessing the cache memory system according to the invention. It is a characteristic part of the invention that, in the event of a read request, the cache memory system enables the back-off signal $\overline{\text{BOFF}}$ if the read request is a miss, so as to temporarily halt the CPU until the requested data are moved from the primary memory to the cache memory. Moreover, no matter whether the initially received read request is a hit or a miss, the cache memory system is promptly put into the ready state for data transfer. This feature allows a low-speed tag RAM to be used in conjunction with a high-speed CPU while nonetheless allowing the overall performance of the computer system to be high. In the case of a miss, the CPU needs to reissue the same data read request signal once again so as to read the requested data from the cache memory, which will consume additional clock periods to achieve. However, compared to the prior art, the time required by this action is exactly equal to the time required by the prior art to move the requested data from the primary memory to the cache memory and subsequently from the cache memory to the CPU. The invention is nonetheless an overall improvement over the prior art.

In conclusion, the cache memory system of the invention has the following advantages over the prior art.

(1) First, when the cache memory system of the invention is used in conjunction with a high-speed CPU, the overall performance of the computer system is high even when a low-speed tag RAM is used in the cache memory system.

(2) Second, the manufacturing cost of the computer system utilizing the cache memory system of the invention is considerably reduced due to the use of a low-speed tag RAM in the cache memory system without affecting the overall performance of the computer system.

(3) Third, the computer system utilizing the cache memory system of the invention can offer high performance without having to use a high-speed cache memory module, allowing a high-performance computer system to be extremely cost-effective to use.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A cache memory system for use in conjunction with a computer system having a primary memory unit and a CPU of the type having a back-off function that can be activated to temporarily halt the CPU when receiving a back-off signal, wherein the cache memory system is capable of enabling the back-off signal in the event that a data read request signal from the CPU is determined to be a miss so as to temporarily halt the CPU, and is capable of disabling the back-off signal after the requested data have been moved from the primary memory unit to the cache memory system; and wherein if the data read request signal is a miss and if the data currently stored in the cache memory module have not been updated, the cache memory system performs the actions of:

moving the requested data from the primary memory unit to the cache memory module; and then disabling the back-off signal.

2. The cache memory system of claim 1, wherein if the data read request signal is a hit, the cache memory system performs the action of:

moving the requested data from the cache memory module to the CPU.

3. The cache memory system of claim 2, wherein the CPU, the primary memory unit, the cache memory module, and the cache control circuit are interconnected via a common data bus for data transfer to and from each other.

4. The cache memory system of claim 1, wherein if the data read request signal is a miss and if the data currently stored in the cache memory module have been updated, the cache memory system performs the actions of:

moving the updated data from the cache memory module to the primary memory unit, and then disabling the back-off signal.

5. The cache memory system of claim 1, wherein the cache memory system and the CPU are driven by a common clock signal.

6. The cache memory system of claim 5, wherein in the event of receiving a data write request signal from the CPU, the cache memory system performs the actions of:

requesting the CPU to allow one additional clock period for response; and checking whether the data write request signal is a hit, wherein if it is a hit the outputted data from the CPU is written into the cache memory module.

7. The cache memory system of claim 6, wherein the cache memory system further performs, if the data write request signal is a miss, the actions of:

transferring the outputted data from the CPU to the primary memory unit; and moving the requested data from the primary memory unit to the cache memory module.

8. The cache memory system of claim 7, which comprises:

a cache memory module, coupled to the CPU and the primary memory unit, for storing selected blocks of data from the primary memory unit; and a cache control circuit for controlling data transfer among the cache memory module, the primary memory unit, and the CPU.

9. The cache memory system of claim 8, wherein the cache memory module comprises:

a data RAM unit for storing the selected blocks of data from the primary memory unit; and a tag RAM unit for storing the tag values of the data stored in the data RAM unit.

10. The cache memory system of claim 9, wherein the data RAM unit is coupled via a common data bus for data transfer to and from the primary memory unit and the CPU.

11. The cache memory system of claim 10, wherein the data RAM unit is an SRAM unit.

12. The cache memory system of claim 11, wherein the data RAM unit is a PBSRAM unit.

13. The cache memory system of claim 10, wherein the tag RAM unit is coupled to the common data bus for data transfer to the cache control circuit.

14. The cache memory system of claim 13, wherein the tag RAM unit is an SRAM unit.

15. The cache memory system of claim 14, wherein the tag RAM unit stores a dirty bit whose value indicates whether the data currently stored in the data RAM unit have been updated.

16. A cache memory system for use in conjunction with a computer system having a primary memory unit and a CPU of a type having a back-off function that can be activated to temporarily halt the CPU when receiving a back-off signal, the cache memory system comprising:

a cache memory module, coupled via a common data bus to the CPU and the primary memory unit, for storing selected blocks of data from the primary memory unit; and a cache control circuit for controlling data transfer among the cache memory module, the primary memory unit, and the CPU wherein the cache memory system is capable of enabling the back-off signal in the event that a data read request signal from the CPU is determined to be a miss so as to temporarily halt the CPU, and is capable of disabling the back-off signal after the requested data have been moved from the primary memory unit to the cache memory system;

wherein if the data read request signal is a hit, the cache memory system performs the action of moving the requested data from the cache memory module to the CPU;

if the data read request signal is a miss and if the data currently stored in the cache memory module have not been updated, the cache memory system performs the actions of moving the requested data from the primary memory unit to the cache memory module; and then disabling the back-off signal;

if the data read request signal is a miss and if the data currently stored in the cache memory module have been updated, the cache memory system performs the actions of moving the updated data from the cache memory module to the primary memory unit, and then disabling the back-off signal; and wherein in the event of receiving a data write request signal from the CPU, the cache memory system performs the actions of requesting the CPU to allow one additional clock period for response and checking whether the data write request signal is a hit or a miss, wherein if it is a hit, the outputted data from the CPU is written into the cache memory module; and if it is a miss, the outputted data from the CPU is transferred to the primary memory unit and then moving the requested data from the primary memory unit to the cache memory module.

17. The cache memory system of claim 16, wherein the cache memory module comprises:

a data RAM unit for storing the selected blocks of data from the primary memory unit; and a tag RAM unit for storing the tag values of the data stored in the data RAM unit.

18. The cache memory system of claim 17, wherein the data RAM unit is coupled to the common data bus for data transfer to and from the primary memory unit and the CPU.

19. The cache memory system of claim 18, wherein the data RAM unit is an SRAM unit.

20. The cache memory system of claim 19, wherein the data RAM unit is a PBSRAM unit.

21. The cache memory system of claim 18, wherein the tag RAM unit is coupled to the common data bus for data transfer to the cache control circuit.

22. The cache memory system of claim 21, wherein the tag RAM unit is an SRAM unit.

23. The cache memory system of claim 22, wherein the tag RAM unit stores a dirty bit whose value indicates whether the data currently stored in the data RAM unit have been updated.

24. A cache memory system for use in conjunction with a computer system having a primary memory unit and a CPU of the type having a back-off function that can be activated to temporarily halt the CPU when receiving a back-off signal, the cache memory system comprising:

a data RAM unit for storing selected blocks of data from the primary memory unit;

a tag RAM unit for storing the tag values of the data stored in the data RAM unit; and a cache control circuit for controlling data transfer among the cache memory module, the primary memory unit, and the CPU, wherein the cache memory system is capable of enabling the back-off signal in the event that a data read request signal from the CPU is determined to be a miss so as to temporarily halt the CPU, and is capable of disabling the back-off signal after the requested data have been moved from the primary memory unit to the cache memory system, wherein if the data read request signal is a hit, the cache memory system performs the action of moving the requested data from the cache memory module to the CPU;

if the data read request signal is a miss and if the data currently stored in the cache memory module have not been updated, the cache memory system performs the actions of moving the requested data from the primary memory unit to the cache memory module; and then disabling the back-off signal;

if the data read request signal is a miss and if the data currently stored in the cache memory module have been updated, the cache memory system performs the actions of moving the updated data from the cache memory module to the primary memory unit, and then disabling the back-off signal; and wherein in the event of receiving a data write request signal from the CPU, the cache memory system performs the actions of requesting the CPU to allow one additional clock period for response; and then checking whether the data write request signal is a hit or a miss, wherein if it is a hit, the outputted data from the CPU is written into the cache memory module; and if it is a miss, the outputted data from the CPU is transferred to the primary memory unit and then the requested data is moved from the primary memory unit to the cache memory module.

25. The cache memory system of claim 24, wherein the data RAM unit is an SRAM unit.

26. The cache memory system of claim 25, wherein the data RAM unit is a PBSRAM unit.

27. The cache memory system of claim 25, wherein the tag RAM unit is an SRAM unit.

28. A method for accessing a cache memory system of the type including a cache control circuit, a data RAM unit, and a tag RAM unit, from a computer system having a primary memory unit and a CPU of the type having a back-off function that can be activated to temporarily halt the CPU when receiving a back-off signal wherein the method, in the event of the CPU issuing a data read request signal to the cache memory system, comprises the steps of:

setting the cache memory system into a ready state for data transfer to the CPU;

checking whether the data read request signal is a hit or a miss to the cache memory module;

if it is a hit, moving the requested data from the cache memory module to the CPU;

otherwise, if it is a miss, enabling the back-off signal to halt the CPU; and checking whether the data currently stored in the data RAM unit have been updated or not;

if not updated, moving the requested data from the primary memory unit to the cache memory module the CPU; and then disabling the back-off signal to resume CPU operation; and if updated, moving the data currently stored in the cache memory module back to the primary memory unit; then moving the requested data from the primary memory unit to the cache memory module; and then disabling the back-off signal to resume CPU operation.

29. The method of claim 28, further comprising, in the event of the CPU issuing a data write request signal to the cache memory system, the steps of:

requesting the CPU to allow one additional clock period for response;

checking whether the data write request signal is a hit or a miss;

if it is a hit, writing the outputted data from the CPU into the cache memory module; and if it is a miss, transferring the outputted data from the CPU to the primary memory unit; and moving the requested data from the primary memory unit to the cache memory module.

30. The method of claim 29, further comprising the step of setting a dirty bit to indicate that the data currently stored in the cache memory module have been updated after the writing of the outputted data from the CPU to the cache memory module is completed.

* * * * *